United States Patent
Nakashima et al.

(10) Patent No.: US 6,774,965 B2
(45) Date of Patent: Aug. 10, 2004

(54) LIQUID CRYSTAL DISPLAY DEVICE AND MANUFACTURING METHOD THEREOF

(75) Inventors: Ken Nakashima, Kikuchi-gun (JP); Yasushi Matsui, Kikuchi-gun (JP); Yasunori Niwano, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 10/372,315

(22) Filed: Feb. 25, 2003

(65) Prior Publication Data

US 2003/0160921 A1 Aug. 28, 2003

(30) Foreign Application Priority Data

Feb. 25, 2002 (JP) ........................................ 2002-048074

(51) Int. Cl.[7] .......................................... G02F 1/1335
(52) U.S. Cl. ........................................ 349/114; 349/113
(58) Field of Search ................................. 349/113, 114

(56) References Cited

U.S. PATENT DOCUMENTS

| | | | |
|---|---|---|---|
| 6,452,654 B2 * | 9/2002 | Kubo et al. ................. | 349/114 |
| 6,466,280 B1 * | 10/2002 | Park et al. .................... | 349/43 |
| 6,493,051 B2 * | 12/2002 | Ha et al. ..................... | 349/113 |
| 6,580,480 B2 * | 6/2003 | Baek et al. ................. | 349/114 |
| 6,614,496 B1 * | 9/2003 | Song et al. ................. | 349/114 |
| 6,620,655 B2 * | 9/2003 | Ha et al. ..................... | 438/149 |
| 6,621,543 B2 * | 9/2003 | Moon ......................... | 349/115 |
| 6,624,860 B1 * | 9/2003 | Narutaki et al. ............ | 349/106 |

FOREIGN PATENT DOCUMENTS

| | | |
|---|---|---|
| JP | 7-333598 | 12/1995 |
| JP | 2000-19563 | 1/2000 |
| JP | 2000-305110 | 11/2000 |

* cited by examiner

*Primary Examiner*—James A. Dudek
(74) *Attorney, Agent, or Firm*—Oblon, Spivak, McClelland, Maier & Neustadt, P.C.

(57) ABSTRACT

A semi-transmissive liquid crystal display device is provided with a pixel electrode having in one pixel a reflective electrode reflecting outside light, and a transmissive electrode transmitting light from a back light source, on one of a pair of substrates facing to each other with a liquid crystal film placed in between. The reflective electrode and the transmissive electrode constituting the pixel electrode are formed without having a insulation layer in between. A manufacturing process thereof is simplified by halftone exposure.

18 Claims, 7 Drawing Sheets

LIQUID CRYSTAL DISPLAY DEVICE AND MANUFACTURING METHOD THEREOF

BACKGROUND OF THE INVENTION

1. Field of the Invention

The present invention relates to a liquid crystal display device provided with a pixel electrode having in one pixel a reflective electrode reflecting outside light and a transmissive electrode transmitting light from a back light source, and a manufacturing method thereof.

2. Related Background Art

In a general liquid crystal display device, a thin film of liquid crystal is placed between two substrates. Each of the substrates has an electrode on the surface facing the liquid crystal film. The polarizers are placed on both sides of the substrates. In a transmissive liquid crystal display device, a backlight is positioned behind the substrates. Alignment treatment is provided on the substrate surfaces having the electrode. A liquid crystal having desirable director, the average direction of liquid crystal molecules, exhibits birefringence. Incident light coming from the backlight through the polarizer becomes elliptic polarized light due to the birefringence, and enters the polarizer on the opposite side. When applying voltage between the upper and lower electrodes, it rearranges the director to change the birefringence of the liquid crystal film, thereby changing the condition of the elliptic polarized light entering the polarizer on the opposite side. Electro-optical effect of changing intensity and spectrum of light passing through the liquid crystal display device is thus obtained.

There are two types of liquid crystal display devices: a transmissive liquid crystal display device displaying images with a backlight (rear light source) mounted at the back or side thereof, and a reflective liquid crystal display device displaying images by reflecting incoming ambient light on a reflector mounted to a substrate. The transmissive liquid crystal display device has the problem that displayed images are invisible under bright ambient light because display light is darker than the ambient light. On the other hand, the reflective liquid crystal display device has the problem of having significantly decreased visibility under dark ambient light.

In order to solve the above problems, a liquid crystal display device employing a semi-transmissive reflective film transmitting a portion of light while reflecting another portion of light, which will be referred to hereinafter as a semi-transmissive liquid crystal display device, has been proposed. The semi-transmissive liquid crystal display device is disclosed in Japanese Patent Application Laid-Open No. H07-333598, No. 2000-19563, and No. 2000-305110, for example.

SUMMARY OF THE INVENTION

However, the conventional semi-transmissive liquid crystal display devices disclosed in the above applications have problems of complicated manufacturing processes and low manufacturing yields.

The present invention has been accomplished to solve the above problems and an object of the present invention is thus to provide a liquid crystal display device manufactured in simple processes while having high manufacturing yields, and a method of manufacturing the same.

A liquid crystal display device according to the present invention is a liquid crystal display device provided with liquid crystal material sealed between substrates and having a pixel electrode in a pixel on one of the substrates, the pixel electrode having a reflective electrode (for example, third metal thin films 10 and 11 in the following preferred embodiment of the invention) for reflecting light from outside, a transmissive electrode (for example, a conductive thin film 9 in the preferred embodiment of the invention) for transmitting light from a back light source, wherein the reflective electrode and the transmissive electrode are laminated with no insulating layers interposed therebetween. The liquid crystal display devices having the above configuration is easy to manufacture and produces high manufacturing yields.

The reflective electrode is preferably formed at a top layer directly under an alignment layer. It is also preferable to configure the reflective electrode by forming a conductive material to cover the reflective electrode before pattern formation, and removing the conductive material after the pattern formation, in order to prevent erosion of the transmissive electrode.

In a preferred embodiment, material of the reflective electrode includes aluminum, and material of the conductive material includes one of chromium, molybdenum, tantalum, and tungsten.

It is also preferable that a part of the transmissive electrode is removed at a connection between the transmissive electrode and the first metal thin film, and/or at a connection between the transmissive electrode and the second metal thin film, and the part is covered with the reflective electrode, so that the reflective electrode is connected to the first metal thin film and/or the second metal thin film. The configuration reduces connection resistance between the transmissive electrode and the first or second metal thin film.

Further, a periphery of the transmissive electrode in a pixel is preferably covered with the reflective electrode for stronger adhesion.

It is also preferable that the transmissive electrode has a concavity in a pixel and inner side portion of the concavity is covered with the reflective electrode.

More preferably, the overlap of the reflective electrode with the inner side portion of the concavity on the transmissive electrode in the pixel is 2 $\mu$m to 6 $\mu$m.

Besides, it is preferable in the pixel that a semiconductor film of a thin film transistor (TFT) section extends to a lower part of a source line.

On the other hand, a manufacturing method of a liquid crystal display device according to the present invention is a manufacturing method of a liquid crystal display device provided with liquid crystal material sealed between substrates and having a pixel electrode in a pixel on one of the substrates, the pixel electrode having a reflective electrode for reflecting light from outside and a transmissive electrode for transmitting light from a back light source, the manufacturing method having a step of forming the transmissive electrode and a step of forming the reflective electrode on the transmissive electrode, with no insulating layers interposed therebetween. In this method, the liquid crystal display is easy to manufacture and produces high manufacturing yields.

It is preferable that the step of forming the reflective electrode includes a step of forming a conductive material to cover the reflective electrode before pattern formation, and a step of removing the conductive material after the pattern formation In a preferred embodiment, material of the reflective electrode includes aluminum, and material of the conductive material includes one of chromium, molybdenum, tantalum, and tungsten.

Another manufacturing method of a liquid crystal display device according to the present invention is a manufacturing method of a liquid crystal display device provided with liquid crystal material sealed between substrates and having a pixel electrode in a pixel on one of the substrates, the pixel electrode having a reflective electrode for reflecting light from outside and a transmissive electrode for transmitting light from a back light source, the manufacturing method having a step of forming and patterning the first metal thin film on an insulating substrate; a step of depositing the first insulation layer, a semiconductor active layer, an ohmic contact layer, and the second metal thin film; a step of forming a resist pattern by halftone exposure; and a step of patterning the semiconductor active layer, the ohmic contact layer, and the second metal thin film by etching. In this method, it is possible to decrease photographic processes to facilitate manufacture and attain high manufacturing yields.

It is preferable that the above method further has, after the step of patterning the semiconductor active layer, the ohmic contact layer, and the second metal thin film by etching, a step of forming the second insulation layer; a step of forming a uneven pattern by halftone exposure; and a step of patterning the first and second insulation layer by etching. In this method, it is possible to further decrease photographic processes to facilitate manufacture and attain high manufacturing yields.

Another manufacturing method of a liquid crystal display device according to the present invention is a manufacturing method of a liquid crystal display device provided with liquid crystal material sealed between substrates and having a pixel electrode in a pixel on one of the substrates, the pixel electrode having a reflective electrode for reflecting light from outside and a transmissive electrode for transmitting light from a back light source, the manufacturing method having a step of forming and patterning the first metal thin film on an insulating substrate; a step of depositing the first insulation layer, a semiconductor active layer, an ohmic contact layer, and the second metal thin film; a step of depositing the semiconductor active layer, the ohmic contact layer, and the second metal thin film; a step of forming a resist pattern by halftone exposure; and, after the step of patterning the semiconductor active layer, the ohmic contact layer, and the second metal thin film by etching, having a step of forming the second insulation layer; a step of forming a uneven pattern by halftone exposure; and a step of patterning the first and second insulation layers by etching. In this manufacturing method, it is possible to decrease photographic processes to facilitate manufacture and attain high manufacturing yields.

It is possible that the step of forming the transmissive electrode includes a step of forming amorphous indium tin oxide (ITO); a step of patterning the amorphous ITO; and a step of crystallizing the amorphous ITO. It is preferable in the step of crystallizing the amorphous ITO that the amorphous ITO is heated to 200° C. or above for crystallization.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

FIGS. 1A to 1G show a manufacturing process flow chart of a semi-transmissive liquid crystal display device according to the first embodiment of the present invention. In the manufacturing process, a semi-transmissive TFT array is produced in seven times of photolithography processes.

First, a glass substrate to be used as an insulating substrate is cleaned. A transparent insulating substrate such as a glass substrate is used as the insulating substrate. While the insulating substrate can have any thickness, the substrate not over 1.1 mm thick is preferable for a thin liquid crystal display device. If the insulating substrate is too thin, however, it could be distorted by thermal history of film depositions and other processes, causing decreased patterning accuracy. Therefore, the thickness of the insulating substrate should be decided in consideration of the processes to be used. Besides, in a case that the insulating substrate is composed of brittle fracturable material such as glass, it is preferable to cut off the edges of the substrate in order to prevent any foreign matter from getting inside due to chipping. It is also preferable to make a notch on the insulating substrate to identify its direction, so that a direction of substrate processing can be easily determined in the following processes.

In the next place, the first metal thin film 1 is formed by a deposition process such as sputtering. The first metal thin film 1 is a thin film 100 nm to 500 nm thick composed of one of chromium, molybdenum, tantalum, titanium, aluminum, copper, and alloy combining another substance with one of those elements, for example. Chromium having 200 nm film thickness is used in a preferred embodiment. As the first metal thin film 1, it is preferable to use a metal thin film being resistant to surface oxidation, or being conductive though oxidized, and at least its surface is preferably one of chromium, titanium, tantalum, and molybdenum, because a contact hole will be formed on the first metal thin film 1 by dry etching and also a conductive thin film will be deposited thereon in the following processes. Besides, the first metal thin film 1 may be a laminate of different kinds of metal thin films, or a metal thin film having different composition along the film thickness. In a case that material including aluminum is used as the first metal thin film, aluminum nitride having surface resistivity of 10 to $1000 \mu\Omega$ is desirable.

Figure 1:
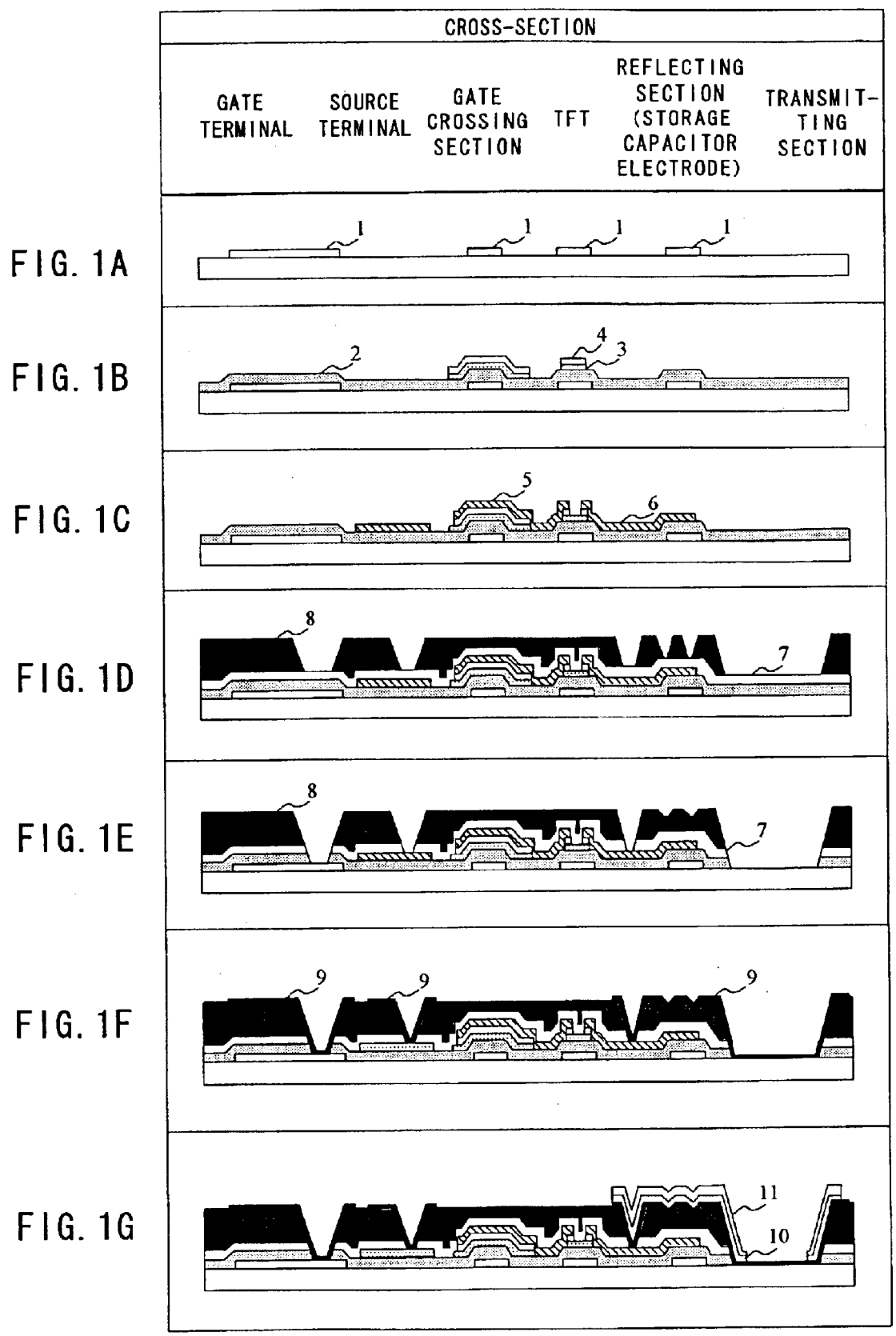
FIGS. 1A to 1G are views to show a process flow chart of a liquid crystal display device according to the first embodiment of the present invention.

Then, the first metal thin film is patterned with a gate electrode, a gate line, a storage capacitor electrode, and a storage capacitor line by the first photolithography process. A configuration shown in FIG. 1A is thereby formed. The photolithography process consists of the following steps: (1) After cleaned, the TFT array substrate is coated with a photoresist and then dried. (2) The photoresist is exposed to light through a mask pattern on which a prescribed pattern has been formed, and then developed. The photoresist onto which a mask pattern is projected is thereby photolithographically formed on the TFT array substrate. (3) After heat-hardened, the photoresist is etched away from the substrate. If the photoresist and the TFT array substrate have such a low fluidity as to repel the photoresist, conduct a treatment such as ultraviolet (UV) cleaning before the photoresist coating, and vapor-coating of hexamethyldisilazane (HMDS) for the better fluidity. If there is adhesion failure of the photoresist to the TFT array substrate, causing to strip the photoresist away, increase heat-hardening temperature, or prolong heat-hardening time. The etching of the first metal thin film can be wet etching using a known etchant (for example, a solution of a mixture of cerium ammonium nitrate and nitric acid if the first metal thin film composed of chromium). The first metal thin film 1 is preferably etched so that a pattern edge has a tapered shape in order to prevent short-circuit caused by height difference from another line. The pattern edge is therefore etched to have a trapezoid shape of the gate line. In addition to the gate electrode, gate line, storage capacitor electrode, and storage capacitor line, there are also formed in this process marks and lines necessary for the TFT array substrate formation.

In the third place, the first insulation layer 2, a semiconductor active layer 3, and an ohmic contact layer 4 are deposited in succession by a plasma chemical vapor deposition (CVD) process. As the first insulation layer 2 to be a gate insulation layer, a SiNx film, SiOy film, SiOzNw film, or a lamination film of those is used (x, y, z, and w are all positive numbers). The first insulation layer 2 is approximately 300 nm to 600 nm thick. The first insulation layer 2 is preferably thicker than the first metal thin film 1 because the thinner film thickness causes short-circuit at a crossing point between the gate line and the source line. In terms of display properties, on the other hand, the thinner film thickness is preferable because a thick film causes reduced on-state current of the TFT. In a preferred embodiment, the first insulation layer 2 is formed by depositing SiN film 300 nm thick and further depositing SiN film 100 nm thick.

As the semiconductor active layer 3, an amorphous silicon (a-Si) film or a poly silicon (p-Si) film is used. The semiconductor active layer 3 is approximately 100 nm to 300 nm thick. If the film is too thin, it causes dissolution of the ohmic contact layer 4 in a dry etching process which will be detailed later; on the other hand, if the film is too thick, it causes reduction of on-state current of the TFT. Therefore, the film thickness is determined by controllability of etching depth at the time of dry-etching of the ohmic contact layer 4, and a necessary amount of on-state current of the TFT. In a case of using an a-Si film as the semiconductor active layer 3, an interface of the first insulation layer 2 and the a-Si film is preferably a SiNx film or a SiOzNw film for better controllability of Vth of the TFT, that is, gate voltage to make the TFT in a conduction state, and for reliability. On the other hand, if using a p-Si film as the semiconductor active layer 3, an interface of the first insulation layer 2 and the p-Si film is preferably a SiOy film or a SiOzNw film for better controllability of Vth of the TFT and for reliability. Besides, in the case of using the a-Si film as the semiconductor active layer 3, it is desirable to deposit a film with a smaller deposition rate in a lower part adjacent to the interface with the first insulation layer 2, and with a larger deposition rate in an upper layer, in order to obtain the TFT property of larger mobility in shorter deposition time, and reduce leakage current during the off-state of the TFT. In a preferred embodiment, an i-a-Si film 150 nm thick is deposited as the semiconductor active layer 3.

As the ohmic contact layer 4, a n-a-Si film or a n-p-Si film that is a film a-Si doped with phosphorus (P) is used. The ohmic contact layer 4 is approximately 20 nm to 70 nm thick. The SiNx film, SiOy film, SiOzNw film, a-Si film, p-Si film, n-a-Si film, and n-p-Si film can be deposited by using known gas such as $SiH_4$, $NH_3$, $H_2$, $NO_2$, $PH_3$, $N_2$, and mixed gas of those. In a preferred embodiment, a n-a-Si film 30 nm thick is deposited as the ohmic contact layer 4.

Then, the semiconductor active layer 3 and the ohmic contact layer 4 are patterned on at least a section where the TFT is to be formed, by the second photolithography process. A configuration shown in FIG. 1B is thereby formed. The first insulating layer 2 remains all over the substrate. It is preferable that the semiconductor active layer 3 and the ohmic contact layer 4 remain by patterning in a grade crossing point between the source line, and the gate line and the storage capacitor line, in addition to the section where the TFT will be formed, for larger resistance voltage at the crossing point. Besides, the semiconductor active layer 3 and the ohmic contact layer 4 in the TFT section preferably extend to a lower part of the source line so that the source electrode does not cross the edge of the semiconductor active layer 3 and the ohmic contact layer 4 where there is a difference in level, to avoid disconnection of the source electrode.

The semiconductor active layer 3 and the ohmic contact layer 4 can be dry-etched using known gas composition such as mixed gas of $SF_6$ and $O_2$ or of $CF_4$ and $O_2$.

In the fourth place, the second metal thin film is formed by a deposition process such as sputtering. As the second metal thin film, chromium, molybdenum, tantalum, titanium, aluminum, copper, alloy combining another substance with one of those elements, or lamination film of those is used for example. Chromium of 200 nm thick is deposited in a preferred embodiment.

Then, the second metal thin film is patterned with the source electrode 5 and the drain electrode 6 by the third photolithography process. A configuration shown in FIG. 1C is thereby formed. The source electrode 5 is formed ranging over the crossing point between the source line and the gate line. The drain electrode 6 is formed ranging over a reflecting section. Next, the ohmic contact layer 4 is etched to remove a central part thereof in the TFT section, and expose the semiconductor active layer 3. The ohmic contact layer 4 can be dry-etched using known gas composition such as mixed gas of $SF_6$ and $O_2$ or of $CF_4$ and $O_2$.

In the fifth place, the second insulation layer 7 is formed by the plasma CVD process. An organic layer 8 is then formed by a process such as spin coating, slit coating, and transcription. SiN 100 nm thick is used as the second insulation layer 7 in a preferred embodiment. The organic layer 8 is a known photosensitive organic layer such as PC 335 or PC 405 made by JSR Corporation.

Then, the organic layer 8 is patterned with a form shown in FIG. 1D by the fourth photolithography process. More specifically, the organic layer 8 is patterned so that the first insulation layer 2 is exposed in the section where the first insulation layer 2 and the second insulation layer 7 are to be removed by the following fifth photolithography process. The organic layer 8 is also partly removed in the reflecting section so that the section has an uneven surface.

Then, the organic layer is patterned by the fifth photolithography process. The organic layer in the section where the first and second insulation layers 2 and 7 are to be removed is removed here. The organic layer in the section having an uneven surface is not removed, and proper diffusion property can be obtained by moderately reducing unevenness of the first layer. Subsequently, taper etching is performed to form a configuration shown in FIG. 1E. In the gate terminal, the first insulation layer 2 and the second insulation layer 7 are both removed, and the first metal thin film 1 is exposed, to form a contact hole electrically connecting the gate line with a driving signal source. In the source terminal, the second insulation layer 7 is removed, and the second metal thin film is exposed. In an area between the TFT section and the reflecting section, the second insulation layer is removed, and the drain electrode 6 is exposed. Further, in the transmitting section, the first insulation layer and the second insulation layer are both removed, and the first insulating substrate is exposed. In a case of not removing the organic layer in the transmitting section, it is preferable to add a known bleaching process, that is, a process to enhance transparency of the photosensitive organic layer by ultraviolet light exposure, after the patterning of the organic layer by the photolithography process.

In the sixth place, the conductive thin film 9 is formed by a deposition process such as sputtering. As the conductive thin film 9, ITO or $SnO_2$, which is a transparent conductive film, can be used, and the ITO is especially preferable for better chemical stability. 80 nm thick ITO is used as the conductive thin film 9 in a preferred embodiment. While the ITO may be either crystallized ITO or amorphous ITO, it is necessary for the amorphous ITO to be heated to 180° C. and above for crystallization before depositing the third metal thin film. The amorphous ITO is heated to 200° C. or above in a preferred embodiment.

Then, the conductive thin film 9 is patterned with a pixel electrode and so on, as shown in FIG. 1F, by the sixth photolithography process. Depending on the material used, the conductive thin film 9 may be wet etched using known etchant (for example, a solution of a mixture of hydrochloric acid and nitric acid if crystallized ITO is used). If ITO is used as the conductive thin film 9, dry-etching using known gas composition such as HI and HBr is also possible. In addition to the pixel electrode, there are also formed in this process an electrode of the conductive thin film 9 in a transfer terminal for electrically connecting an opposed substrate and the TFT array substrate using resin including conductive particles. The amorphous ITO can be patterned in the same way as the crystallized ITO if after the heating, while it is patterned using a solution of a mixture of known oxalic acid if before the heating.

In the seventh place, the third metal thin films 10 and 11 are formed by a deposition process such as sputtering. As the third metal thin films 10 and 11, a thin film 100 nm to 500 nm thick composed of one of chromium, molybdenum, tantalum, titanium, aluminum, copper, and alloy combining another substance with one of those elements, for example, is used. The metal thin film 10 prevents the metal thin film 11 from being broken at a portion where there is a difference in level, such as a contact hole. If the breakage is negligible, it is possible not to form the metal thin film 10, which eliminates one step and reduces costs. In a preferred embodiment, after chromium 100 nm thick is deposited, alloy of aluminum and Cu 300 nm thick is deposited, and chromium 100 nm thick is further deposited thereon. Chromium is provided at a top layer directly under an alignment layer because, if the alloy of aluminum and Cu is exposed, it causes a corrosion of the ITO 9 at the time of development in the following photolithography process. Instead of Chromium; molybdenum, tantalum, or tungsten may be used for the same effect.

Then, the third metal thin films 10 and 11, and the chromium of the top layer are patterned with a form of a reflective electrode, and then the chromium of the top layer is etched away, to form the reflective electrode, by the seventh photolithography process. Here, the removal of the organic layer in the transmitting section forms a concavity and could cause alignment defect of liquid crystals due to a difference in level on the organic layer, which decreases display quality. To prevent this problem, an inner side portion of the concavity is preferably covered with the reflective electrode as shown in FIG. 1G. Various studies show that the alignment defect can occur in a range between 2 μm and 6 μm away from the inner side portion. Therefore, the reflective electrode need to have an overlap of 2 μm at least, and 6 μm is enough even in a case where smaller aperture ratio of transmission is allowable, which means 2 μm to 6 μm is a preferable length. If layers are deposited in the order of chromium, aluminum (the metal thin film 11), and chromium (the metal thin film 10) from the top layer, the chromium of the top layer and the chromium of the third layer (the metal thin film 10) can be etched at the same time. In this case, a reflector can be formed in the order of resist patterning, chromium etching, aluminum etching, chromium etching, resist striping, and chromium etching, or in the order of resist patterning, chromium etching, aluminum etching, resist striping, and chromium etching. Also, if the metal thin film 10 and a metal thin film of the top layer are composed of the same material, they can be removed in one etching process. The reflective electrode is formed as a lamination layer of the metal thin film 10 composed of chromium, and the metal thin film 11 composed of alloy of aluminum and Cu on top thereof. The chromium of the top layer has been provided for preventing corrosion of the ITO 9, and it is removed in this step for improved reflectance. The third metal thin film can be wet-etched using known etchant. A configuration shown in FIG. 1G is thereby formed. As described above, in a liquid crystal display device according to the present embodiment of the invention, the reflective electrodes 10 and 11, and the conductive thin film 9 are formed without having an insulation layer in between.

As explained in the foregoing, the TFT array substrate is formed by seven steps of the photolithography process, attaining high manufacturing yields.

Though the first embodiment explains a case where two layers of the third metal thin films, 10 and 11 are formed, the present invention is not restricted thereto, whereas it can be a single layer of the third metal thin film 11.

The second, third, and fourth embodiments of the present embodiment will explain a case where a single layer of the third metal thin film 11 is formed.

Use of a developer that prevents ITO from corrosion, such as ELM-DSA made by Mitsubishi Chemical Corporation in the photolithography process to form the metal thin films 10 and 11 can eliminate the metal of the top layer, that is, the metal composed of one of molybdenum, tantalum, and tungsten, to reduce the number of manufacturing steps. The following embodiments will explain a case where chromium is provided at the top layer.

FIGS. 2A to 2F show a process flow chart of a semi-transmissive liquid crystal display device according to the second embodiment of the present invention. In this process, a semi-transmissive TFT array is produced in six times of photolithography processes.

First, a glass substrate 0.7 mm thick to be used as an insulating substrate is cleaned. The insulating substrate is the same as the one explained in the above first embodiment, and the explanation is omitted here.

In the next place, the first metal thin film 1 is formed by a deposition process such as sputtering. The first metal thin film 1 is a thin film 100 nm to 500 nm thick composed of one of chromium, molybdenum, tantalum, titanium, aluminum, copper, and alloy combining another substance with one of those elements, for example. A chromium film 200 nm thick is used in a preferred embodiment. The metal thin film 1 is the same as the one explained in the above first embodiment, and the explanation is omitted here.

Figure 2:
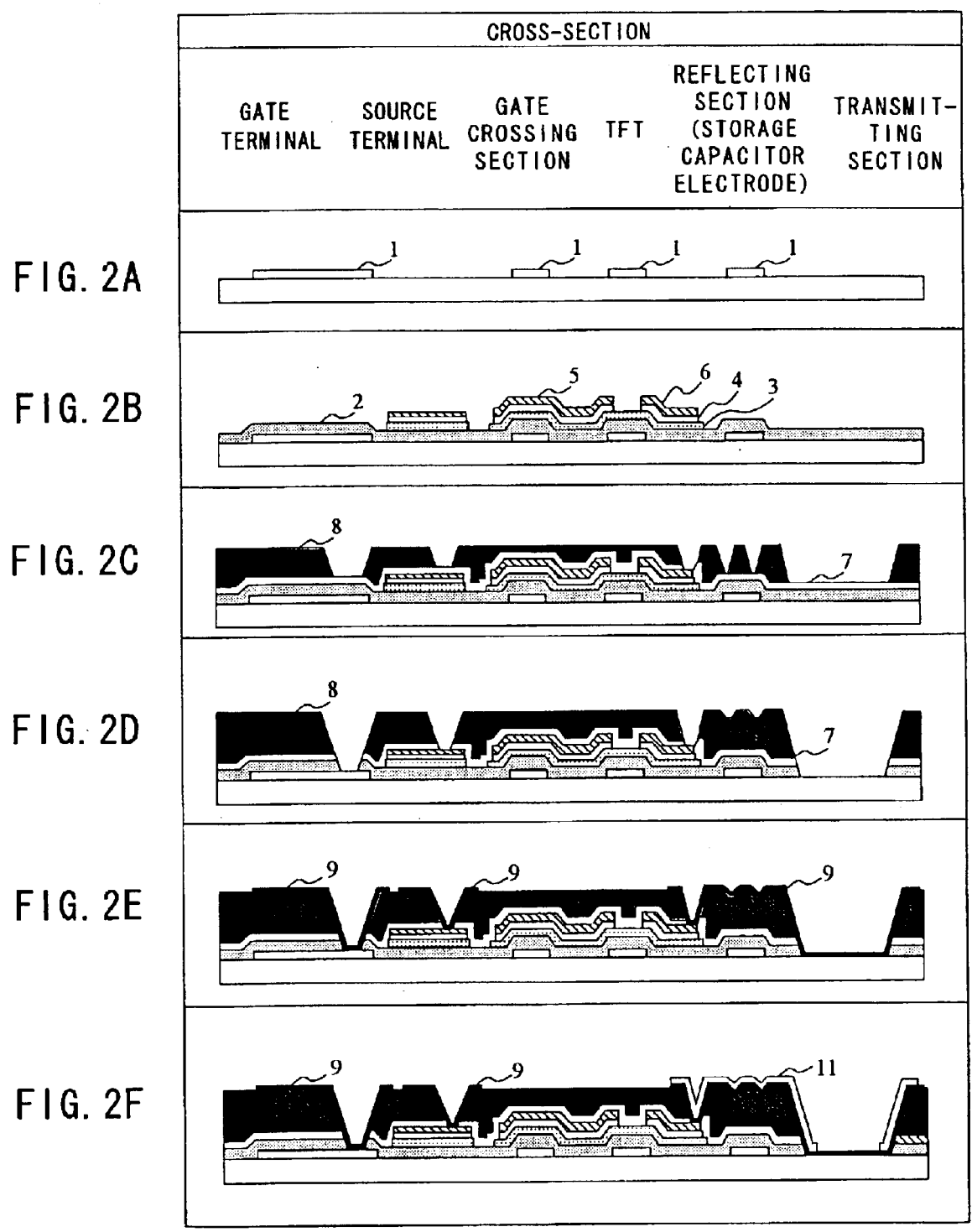
FIGS. 2A to 2F are views to show a process flow chart of a liquid crystal display device according to the second embodiment of the present invention.

Then, the first metal thin film is patterned with a gate electrode, a gate line, a storage capacitor electrode, and a storage capacitor line by the first photolithography process. A configuration shown in FIG. 2A is thereby formed. The manufacturing method of this configuration is the same as the one explained in the above first embodiment, and the explanation is omitted here.

In the third place, the first insulation layer 2, a semiconductor active layer 3, an ohmic contact layer 4, and the second metal thin film are deposited in succession. In a preferred embodiment, a lamination film of a SiN film 300 nm thick and a SiN film 100 nm thick is used as the first insulation layer 2 to be a gate insulation layer. An i-a-Si film 150 nm thick is used as the semiconductor active layer 3. A n-a-Si film 30 nm thick is used as the ohmic contact layer 4. A chromium film 200 nm thick is used as the second metal thin film. The SiN film, a-Si film, and n-a-Si film are deposited by a plasma CVD apparatus. When depositing the ohmic contact layer 4, a film is doped with $PH_3$ to form the n-a-Si film. Chromium is deposited by a DC magnetron sputtering apparatus, for example.

Then, a resist pattern to form a source line, a metal pad at a source terminal, a drain electrode, a semiconductor active layer 3, and so on is formed by the second photolithography process. Halftone exposure is applied in the second photolithography process.

Figure 5:
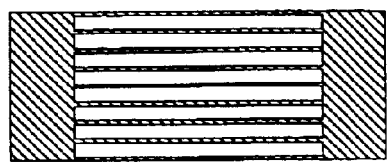
FIG. 5 is a principle view to show a case of forming an uneven pattern by deposition of an organic layer, exposure, and development.
Figure 6:
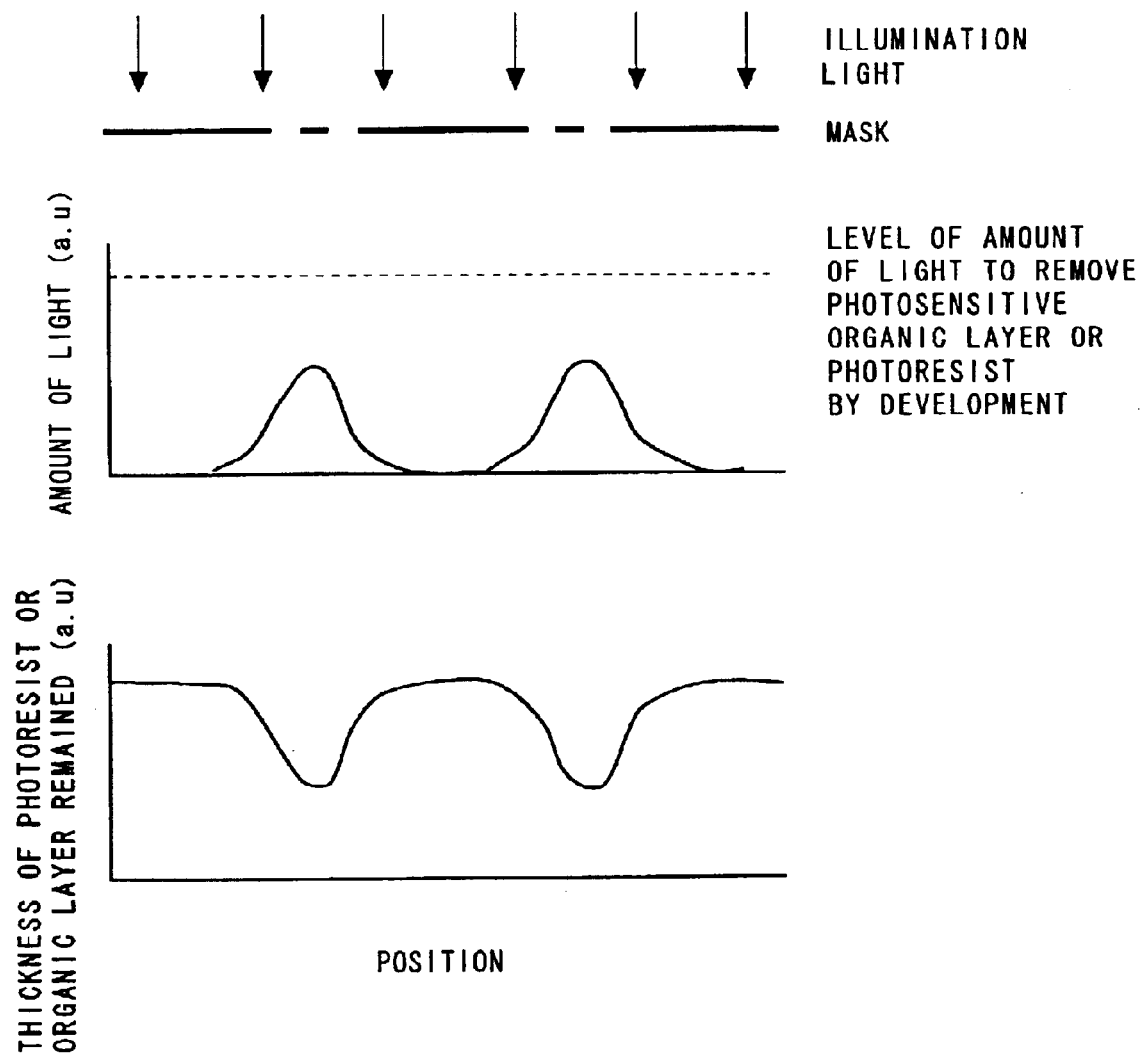
FIG. 6 is a view to show a configuration example of a halftone mask used in the present invention.
Figure 7:
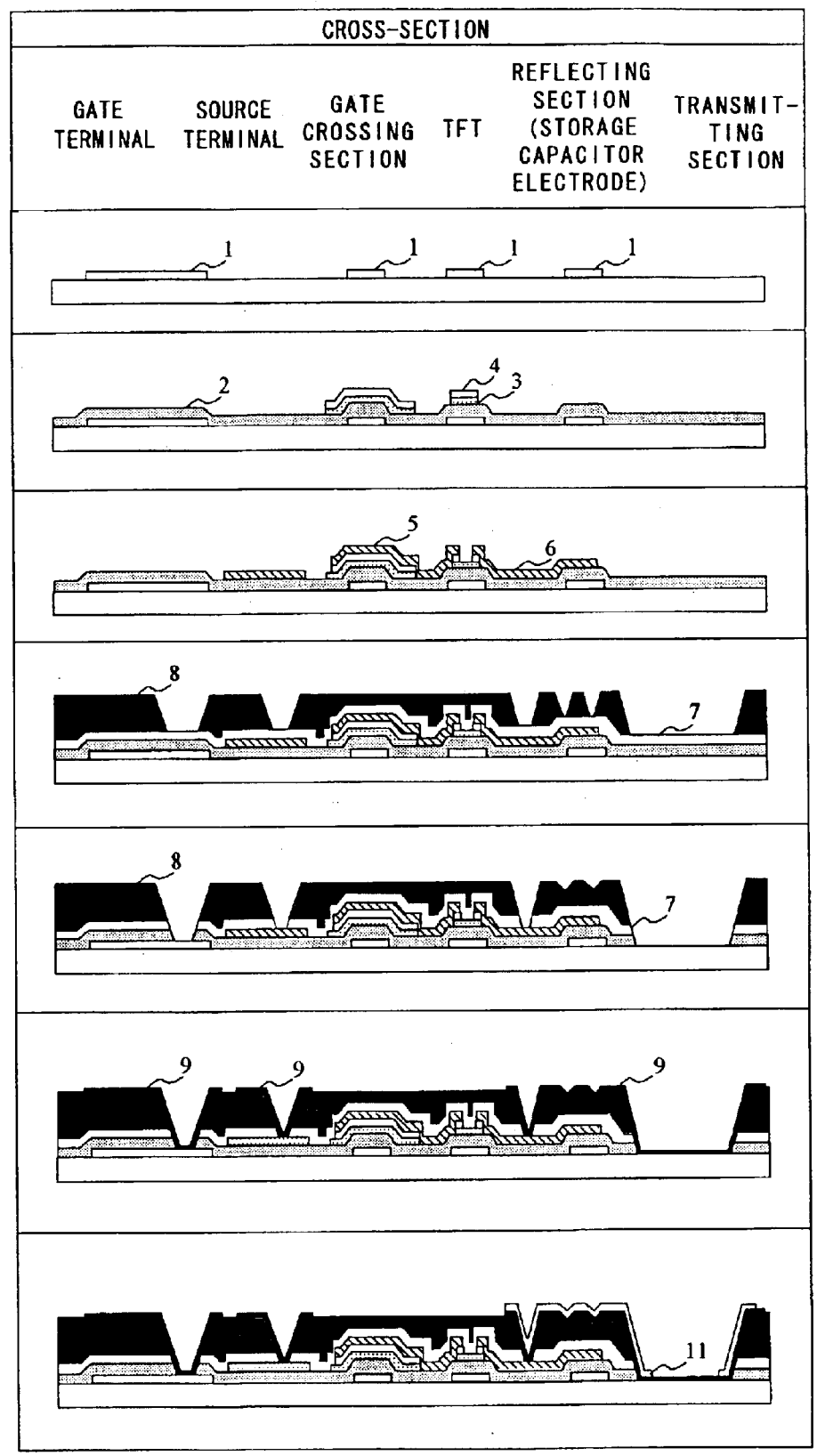
FIGS. 7A to 7G are views to show a process flow chart of a liquid crystal display device according to another embodiment.

The halftone exposure will be explained hereinafter with reference to FIG. 5 and FIG. 6. A mask as shown in FIG. 5 is used in the halftone exposure. A spatial frequency of an exposure pattern on the mask is higher than pattern resolution of an exposure apparatus (1.6 μm, for example) so that the mask pattern is not resolved on a photoresist, thereby adjusting exposure intensity. The photoresist is illuminated through the mask, and adjustment of an amount of the illumination light allows control of remaining film thickness of the photoresist. Therefore, as shown in FIG. 6, adjustment of the amount of light within the range in which the photoresist is dissolved by development changes the remaining film thickness of the photoresist accordingly. More specifically, smaller amount of the photoresist remains in the area receiving a large amount of light, while larger amount of the photoresist remains in the area receiving a smaller amount of light.

Novolac resin-based positive resist is used in the case here, and the resist is coated by 1.5 μm by a spin coater. The resist coating is followed by pre-bake for 90 seconds at 120° C. Then, the resist pattern is formed by 1000 msec exposure using a halftone mask pattern. The mask pattern is a regular mask pattern of chromium, having a striped shape to form the resist pattern of line/space=1.5 μm/1.5 μm. The exposure apparatus used here is a regular stepper or a mirror projection-type, and a light source is g-line and h-line of a high-pressure mercury lamp. Since the striped pattern is smaller than a resolution limit of the exposure apparatus, the resist is not exposed to have the striped pattern, and the exposure amount there becomes smaller than in other exposed area, on average.

Then, the pattern is developed by an organic alkali developer, and post-bake for 180 seconds at 100° C. to 120° C. comes next to volatilize solvent in the resist and also to strengthen adhesion of the resist to the chromium. Further, oven-bake at 120° C. to 130° C. follows for the stronger adhesion between the resist and the chromium. The bake temperature should not be too high here to prevent the resist edge from flagging. After that, the chromium film is etched using a $((NH_4)2[Ce\ (NO_3)_6]+HNO_3+H_2O)$ solution. Then, the ohmic contact layer 4 and the semiconductor active layer 3 are etched using $(HCl+SF_6)$ gas. Resist ashing by oxygen plasma is then performed for 60 seconds at a pressure of 40 Pa so as to expose the chromium film in the resist pattern. In the ashing process, control of a resist opening width is easier in a reactive ion etching (RIE) mode than in a plasma etching (PE) mode. The configuration shown in FIG. 2B is thereby formed.

Then, after oven-bake at 130° C. to 140° C., the chromium film is etched using a $((NH_4)2[Ce\ (NO_3)_6]+HNO_3+H_2O)$ solution. The ohmic contact layer is removed after that.

In the fourth place, the second insulation layer 7 is formed by the plasma CVD process.

Then, the organic layer 8 is patterned with a form shown in FIG. 2C by the third photolithography process. More specifically, the organic layer 8 is patterned so that the first insulation layer 2 is exposed in the section where the first insulation layer 2 and the second insulation layer 7 are to be removed by the following fourth photolithography process. The organic layer 8 is also partly removed in the reflecting section so that the section has an uneven surface.

In the fifth place, the organic layer is patterned by the fourth photolithography process. The organic layer in the section where the first and second insulation layer 2 and 7 are to be removed is removed here. The organic layer in the section having an uneven surface is not removed, and proper diffusion property can be obtained by moderately reducing unevenness in the first layer. Subsequently, taper etching is performed to form a configuration shown in FIG. 2D. In the gate terminal, the first insulation layer 2 and the second insulation layer 7 are both removed, and the first metal thin film 1 is exposed, to form a contact hole electrically connecting the gate line with a driving signal source. In the source terminal, the second insulation layer 7 is removed, and the second metal thin film is exposed. In an area between the TFT section and the reflecting section, the second insulation layer is removed, and the drain electrode 6 is exposed. Further, in the transmitting section, the first insulation layer and the second insulation layer are both removed, and the first insulating substrate is exposed.

In the sixth place, the conductive thin film 9 is formed by a deposition process such as sputtering. ITO 80 nm thick is used as the conductive thin film 9 in a preferred embodiment. While the ITO may be either crystallized ITO or amorphous ITO, it is necessary for the amorphous ITO to be heated to 180° C. and above for crystallization before depositing the third metal thin film. The amorphous ITO is heated to 200° C. or above in a preferred embodiment.

Then, the conductive thin film 9 is patterned with a pixel electrode and so on, as shown in FIG. 2E, by the fifth photolithography process. Depending on the material used, the conductive thin film 9 may be wet-etched using known etchant (for example, a solution of a mixture of hydrochloric acid and nitric acid if crystallized ITO is used). If ITO is used as the conductive thin film 9, dry-etching using known gas composition such as HI and HBr is also possible. In addition to the pixel electrode, there are also formed in this process an electrode of the conductive thin film 9 in a transfer terminal for electrically connecting an opposed substrate and the TFT array substrate using resin including conductive particles. The amorphous ITO can be patterned in the same way as the crystallized ITO if after the heating, while it is patterned using a solution of a mixture of known oxalic acid if before the heating.

In the seventh place, the third metal thin film 11 is formed by a deposition process such as sputtering. As the third metal thin film 11, a thin film 100 nm to 500 nm thick composed of one of chromium, molybdenum, tantalum, titanium, aluminum, copper, and alloy combining another substance with one of those elements, for example, is used. In a preferred embodiment, alloy of aluminum and Cu 300 nm thick is deposited, and chromium 100 nm thick is further deposited thereon. Chromium is provided at a top layer directly under an alignment layer because, if the alloy of aluminum and Cu is exposed, it causes a corrosion of the ITO 9 at the time of development in the following photolithography process. Instead of Chromium; molybdenum, tantalum, or tungsten may be used for the same effect.

Then, the third metal thin film 11 and the chromium of the top layer are patterned with a form of a reflective electrode, and then the chromium of the top layer is etched away, to form the reflective electrode, by the sixth photolithography process. If the metal thin film 11 is chromium, it can be etched at the same time as the chromium of the top layer. The chromium of the top layer has been provided for preventing corrosion of the ITO 9, and it is removed in this step for improved reflectance. The third metal thin film can be wet-etched using known etchant. A configuration shown in FIG. 2F is thereby formed. As described above, in a liquid crystal display device according to the present embodiment of the invention, the reflective electrode 11 and the conductive thin film 9 are formed without having a insulation layer in between.

As explained in the foregoing, the TFT array substrate is formed by six steps of the photolithography process, attaining high manufacturing yields.

FIGS. 3A to 3F show a process flow chart of a semi-transmissive liquid crystal display device according to the third embodiment of the present invention. In this process, a semi-transmissive TFT array is produced using six masks.

First, a glass substrate 0.7 mm thick to be used as an insulating substrate is cleaned. The insulating substrate is the same as the one explained in the above first embodiment, and the explanation is omitted here.

In the next place, the first metal thin film 1 is formed by a deposition process such as sputtering. The first metal thin film 1 is a thin film 100 nm to 500 nm thick composed of one of chromium, molybdenum, tantalum, titanium, aluminum, copper, and alloy combining another substance with one of those elements, for example. A chromium film 200 nm thick is used in a preferred embodiment. The metal thin film 1 is the same as the one explained in the above first embodiment, and the explanation is omitted here.

Figure 3:
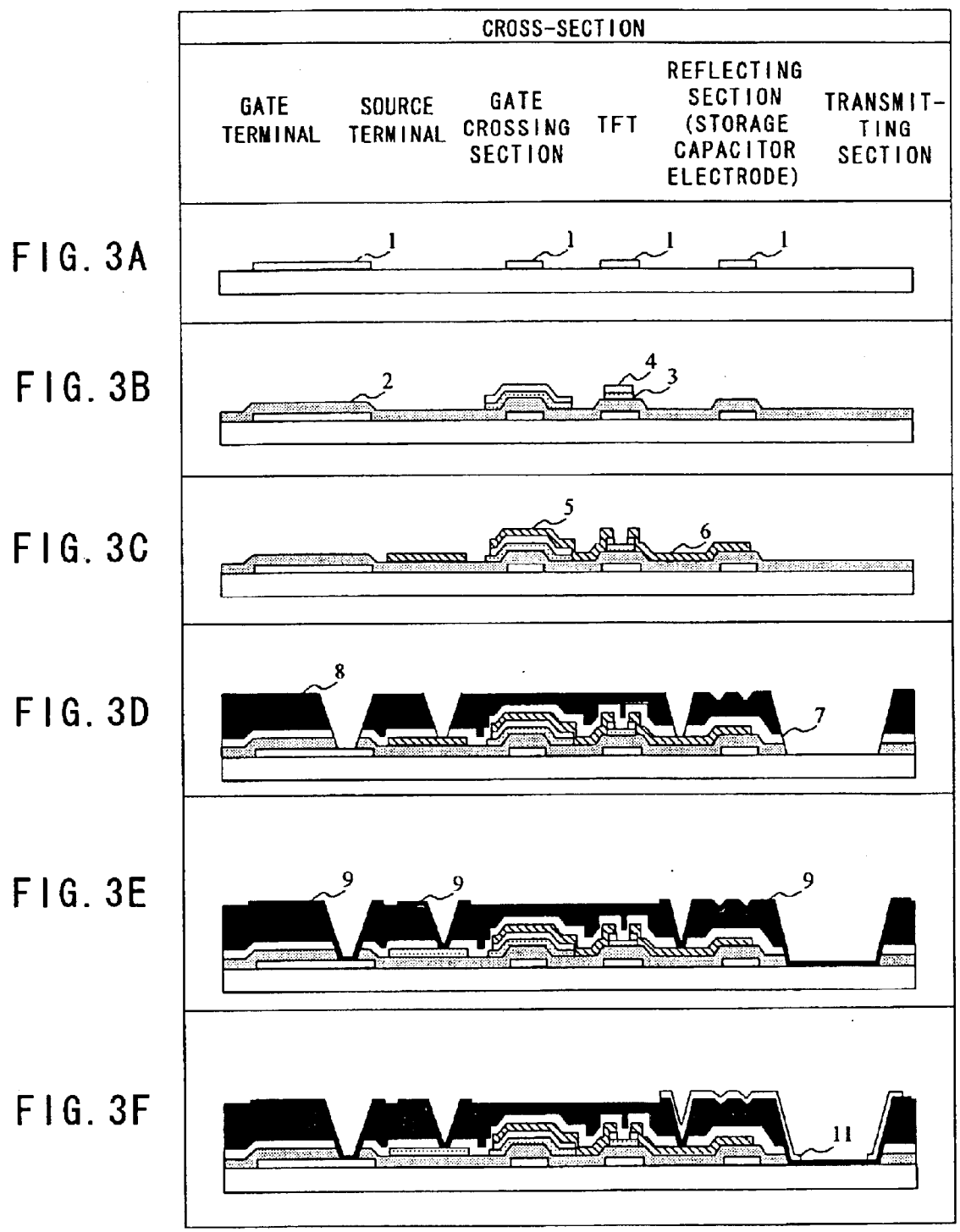
FIGS. 3A to 3F are views to show a process flow chart of a liquid crystal display device according to the third embodiment of the present invention.

Then, the first metal thin film is patterned with a gate electrode, a gate line, a storage capacitor electrode, and a storage capacitor line by the first photolithography process. A configuration shown in FIG. 3A is thereby formed. The manufacturing method of this configuration is the same as the one explained in the above first embodiment, and the explanation is omitted here.

In the third place, the first insulation layer 2, a semiconductor active layer 3, and an ohmic contact layer 4 are deposited in succession by a plasma chemical vapor deposition (CVD) process. Then, a configuration shown in FIG. 3B is formed by etching and so on. The manufacturing method of this configuration is the same as the one explained in the above first embodiment, and the explanation is omitted here.

In the fourth place, the second metal thin film is formed by a deposition process such as sputtering. Chromium, for example, is used as the second metal thin film 1. A chromium film 200 nm thick is deposited in a preferred embodiment.

Then, the second metal thin film is patterned with the source electrode 5 and the drain electrode 6 by the third photolithography process. A configuration shown in FIG. 3C is thereby formed. The source electrode 5 is formed ranging over the crossing point between the source line and the gate line. The drain electrode 6 is formed ranging over a reflecting section. In this process, a central part of the ohmic contact layer 4 in the TFT section is removed to expose the semiconductor active layer 3. The ohmic contact layer 4 can be dry-etched using known gas composition such as mixed gas of $SF_6$ and $O_2$ or of $CF_4$ and $O_2$.

In the fifth place, the second insulation layer 7 is formed by the plasma CVD process. An organic layer 8 then is formed by a process such as spin coating, slit coating, and transcription. SiN 100 nm thick is used as the second insulation layer 7 in a preferred embodiment. The organic layer 8 is a known photosensitive organic layer such as PC 335 or PC 405 made by JSR Corporation.

Then, the organic layer 8 is patterned with a form shown in FIG. 3D by the fourth photolithography process. Halftone exposure is applied in the fourth photolithography process. The halftone exposure is the process explained in the second embodiment of the invention. By the halftone exposure and the following etching, in the gate terminal, the organic layer at the contact hole electrically connecting the gate line with a driving signal source is removed. The first insulation layer 2 and the second insulation layer 7 are both removed by the etching. The first metal thin film 1 is therefore exposed. In the source terminal, the second insulation layer 7 is removed, and the second metal thin film is exposed. In an area between the TFT section and the reflecting section, the second insulation layer is removed, and the drain electrode 6 is exposed. Further, in the transmitting section, the first insulation layer and the second insulation layer are both removed, and the first insulating substrate is exposed. Since the organic layer remains in a concave part of the uneven surface section in the reflective section, and the second insulation layer is not removed, the organic layer forms an uneven surface.

In the sixth place, the conductive thin film 9 is formed by a deposition process such as sputtering. In a transmissive liquid crystal display device, ITO or $SnO_2$, a transparent conductive film, can be used as the conductive thin film 9, and the ITO is especially preferable for better chemical stability. ITO 80 nm thick is used as the conductive thin film 9 in a preferred embodiment. While the ITO may be either crystallized ITO or amorphous ITO, it is necessary for the amorphous ITO to be heated to 180° C. and above for crystallization before depositing the third metal thin film. The amorphous ITO is heated to 200° C. or above in a preferred embodiment.

Then, the conductive thin film 9 is patterned with a pixel electrode and so on, as shown in FIG. 3E, by the fifth photolithography process. Depending on the material used, the conductive thin film 9 may be wet-etched using known etchant (for example, a solution of a mixture of hydrochloric acid and nitric acid if crystallized ITO is used). If ITO is used as the conductive thin film 9, dry-etching using known gas composition such as HI and HBr is also possible. In addition to the pixel electrode, there are also formed in this process an electrode of the conductive thin film 9 in a transfer terminal for electrically connecting an opposed substrate and the TFT array substrate using resin including conductive particles. The amorphous ITO can be patterned in the same way as the crystallized ITO if after the heating, while it is patterned using a solution of a mixture of known oxalic acid if before the heating.

In the seventh place, the third metal thin film 11 is formed by a deposition process such as sputtering. As the third metal thin film 11, a thin film 100 nm to 500 nm thick composed of one of chromium, molybdenum, tantalum, titanium, aluminum, copper, and alloy combining another substance with one of those elements, for example, is used. In a preferred embodiment, after chromium 100 nm thick is deposited, alloy of aluminum and Cu 300 nm thick is deposited, and chromium 100 nm thick is further deposited thereon. Chromium is provided at a top layer directly under an alignment layer because, if the alloy of aluminum and Cu is exposed, it causes corrosion of the ITO 9 at the time of development in the following photolithography process. Instead of Chromium; molybdenum, tantalum, or tungsten may be used for the same effect.

Then, the third metal thin film 11 and the chromium of the top layer are patterned with a form of a reflective electrode to form the reflective electrode, by the sixth photolithography process. If the metal thin film 11 is chromium, it can be etched at the same time as the chromium of the top layer. The third metal thin film can be wet-etched using known etchant. A configuration shown in FIG. 3F is thereby formed. As described above, in a liquid crystal display device according to the present embodiment of the invention, the reflective electrodes 11 and the conductive thin film 9 are formed without having a insulation layer in between.

As explained in the foregoing, the TFT array substrate is formed by six steps of the photolithography process, attaining high manufacturing yields.

FIGS. 4A to 4E show a process flow chart of a semi-transmissive liquid crystal display device according to the fourth embodiment of the present invention. In this process, a semi-transmissive TFT array is produced in five times of photolithography processes.

First, a glass substrate 0.7 mm thick to be used as an insulating substrate is cleaned. The insulating substrate is the same as the one explained in the above first embodiment, and the explanation is omitted here.

In the next place, the first metal thin film 1 is formed by a deposition process such as sputtering. The first metal thin film 1 is a thin film 100 nm to 500 nm thick composed of one of chromium, molybdenum, tantalum, titanium, aluminum, copper, and alloy combining another substance with one of those elements, for example. A chromium film 200 nm thick is used in a preferred embodiment. The metal thin film 1 is the same as the one explained in the above first embodiment, and the explanation is omitted here.

Figure 4:
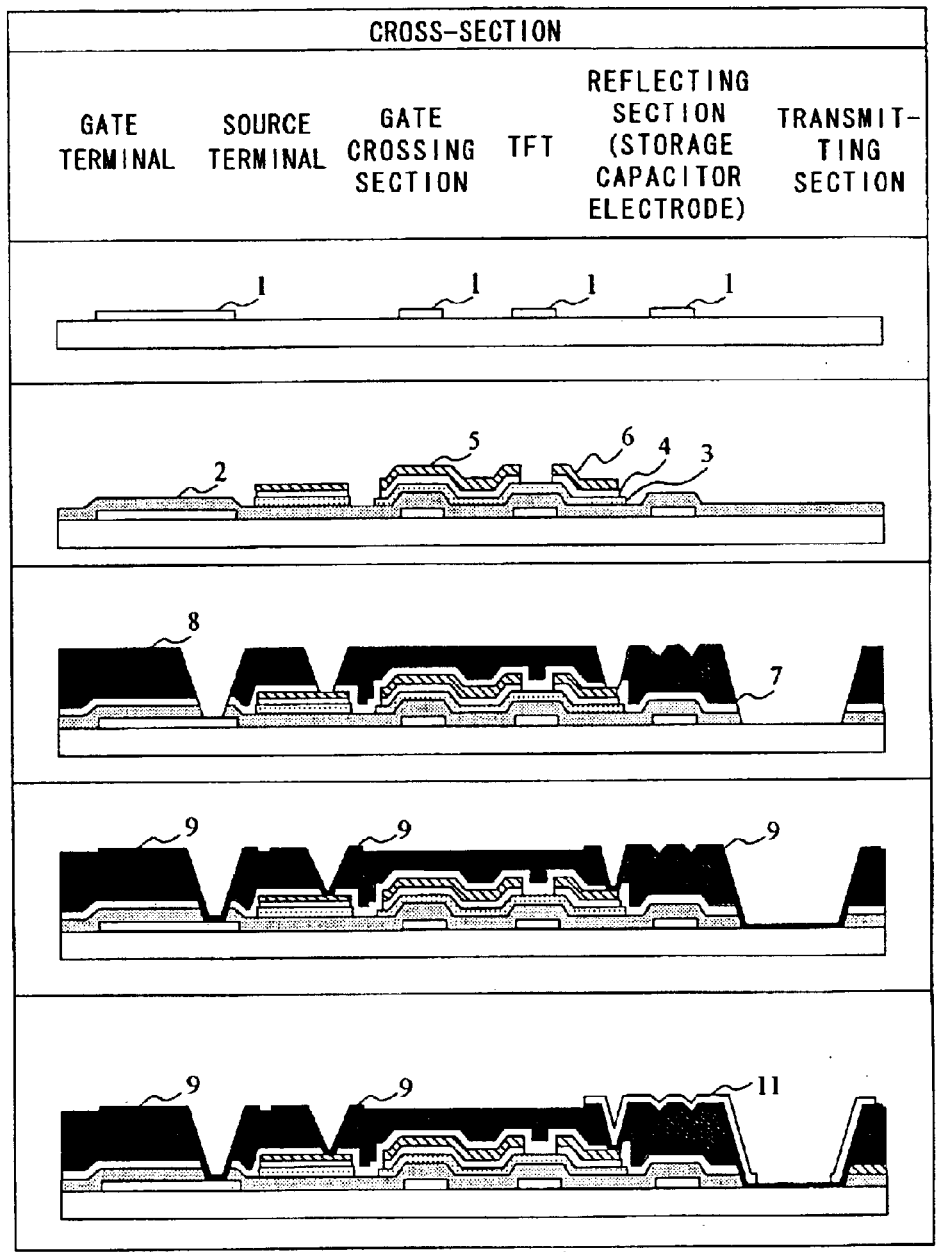
FIGS. 4A to 4E are views to show a process flow chart of a liquid crystal display device according to the fourth embodiment of the present invention.

Then, the first metal thin film is patterned with a gate electrode, a gate line, a storage capacitor electrode, and a storage capacitor line by the first photolithography process. A configuration shown in FIG. 4A is thereby formed. The manufacturing method of this configuration is the same as the one explained in the above first embodiment, and the explanation is omitted here.

In the third place, the first insulation layer 2, a semiconductor active layer 3, an ohmic contact layer 4, and the second metal thin film are deposited in succession. In a preferred embodiment, a lamination film of a SiN film 300 nm thick and a SiN film 100 nm thick is used as the first insulation layer 2 to be a gate insulation layer. An i-a-Si film 150 nm thick is used as the semiconductor active layer 3. A n-a-Si film 30 nm thick is used as the ohmic contact layer 4. A chromium film 200 nm thick is used as the second metal thin film. The SiN film, a-Si film, and n-a-Si film are deposited by a plasma CVD apparatus. When depositing the ohmic contact layer 4, a film is doped with $PH_3$ to form the n-a-Si film. Chromium is deposited by a DC magnetron sputtering apparatus, for example.

Then, a resist pattern to form a source line, a metal pad at a source terminal, a drain electrode, a semiconductor active layer 3, and so on is formed by the second photolithography process. Halftone exposure is applied in the second photolithography process. The halftone exposure is the process explained in the second embodiment of the invention. This process is the same as the one explained in the second embodiment, and the explanation is omitted here. A configuration shown in FIG. 4B is thereby formed.

Then, after the oven-bake at 130° C. to 140° C., the chromium film is etched using a $((NH_4)2[Ce(NO_3)_6]+HNO_3+H_2O)$ solution.

In the fourth place, the second insulation layer 7 and an organic layer 8 are formed by the plasma CVD process. A SiN film 100 nm thick is used as the second insulation layer 7 in a preferred embodiment. The organic layer 8 is a known photosensitive organic layer such as PC 335 or PC 405 made by JSR Corporation.

Then, the organic layer 8 is patterned with a form shown in FIG. 4C by the third photolithography process. Halftone exposure is applied in the third photolithography process. This process is the same as the one explained in the third embodiment, and the explanation is omitted here.

In the fifth place, the conductive thin film 9 is formed by a deposition process such as sputtering. In a transmissive liquid crystal display device, ITO or $SnO_2$, a transparent conductive film, can be used as the conductive thin film 9, and the ITO is especially preferable for better chemical stability. ITO 80 nm thick is used as the conductive thin film 9 in a preferred embodiment.

Then, the conductive thin film 9 is patterned with a form shown in FIG. 4D, including pixel electrode, by the fourth photolithography process. This process is the same as the one explained in the third embodiment, and the explanation is omitted here.

In the sixth place, the third metal thin film 11 is formed by a deposition process such as sputtering. This process is also the same as the one explained in the third embodiment, and the explanation is omitted here. Then, the third metal thin film 11 is patterned with a shape of a reflective electrode to form the reflective electrode, by the fifth photolithography process. A configuration shown in FIG. 4E is thereby formed. As described above, in a liquid crystal display device according to the present embodiment of the invention, the reflective electrode 11 and the conductive thin film 9 are formed without having a insulation layer in between.

As explained in the foregoing, the TFT array substrate is formed by five steps of the photolithography process, attaining high manufacturing yields.

Figure 8:
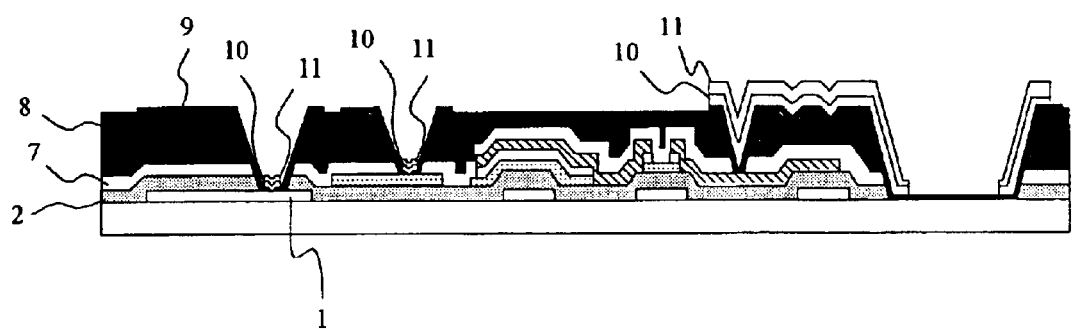
FIG. 8 is a view to show a process flow chart of a liquid crystal display device according to the fifth embodiment of the present invention.

FIG. 8 shows a configuration of a semi-transmissive liquid crystal display device according to the fifth embodiment of the present invention. While the configuration can be formed by any of the first to fourth embodiments, the present embodiment will explain a case where the configuration is formed by the first embodiment.

In a liquid crystal display device according to the present embodiment, at least a part of a transmissive electrode in a connection between the first or second metal thin film and the transmissive electrode (the conductive thin film 9), that is, in a contact hole formed on the first or second insulation layer, is removed, and the part is covered with the third metal thin film 10 or 11. The third metal thin film 10 or 11 is connected to both the conductive thin film 9 and the first or second metal thin film.

Connection resistance between the transmissive electrode and the metal thin film through a contact hole is generally higher than connection resistance between the metal thin films through a contact hole. Therefore, in the above configuration, connection resistance between the transmissive electrode and the first or second metal thin film can be reduced.

The configuration explained above makes it possible to reduce connection resistance between the lines and the transmissive electrode on the TFT array substrate to lessen display problems caused by high connection resistance, thereby attaining high manufacturing yields.

Figure 9:
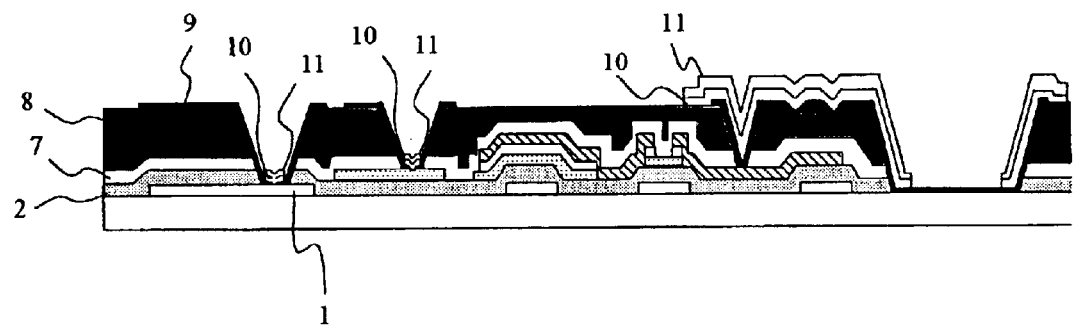
FIG. 9 is a view to show a process flow chart of a liquid crystal display device according to the sixth embodiment of the present invention.

FIG. 9 shows a configuration of a semi-transmissive liquid crystal display device according to the sixth embodiment of the present invention. While the configuration can be formed by any of the first to fourth embodiments, the present embodiment will explain a case where the configuration is formed by the first embodiment.

In a liquid crystal display device according to the present embodiment, in a pixel, a periphery of a transmissive electrode (the conductive thin film 9) on the organic layer is covered with the third metal thin films 10 and 11.

An adhesion strength between a transmissive electrode (the conductive thin film 9) formed on the organic layer and a metal thin film formed on the transmissive electrode without an insulation layer in between is generally smaller than that between the organic layer and the metal thin film formed directly thereon. The small adhesion causes the problem that the transmissive electrode on the organic layer and the metal thin film formed on the transmissive electrode are separated in course of manufacture. The problem, however, is solved in the configuration according to the present embodiment. It is preferable that the end of the transmissive electrode is inside from the end of the metal thin film by at least 1 µm. The transmissive electrode on the insulation substrate and the metal thin film are properly adhered to each other, and the problem of separation between the transmissive electrode and the metal thin film does not occur in an opening of the transmitting section.

The configuration explained above makes it possible to avoid the separation between the transmissive electrode and the third metal thin film on the TFT array substrate, thereby attaining high manufacturing yields.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device provided with liquid crystal material sealed between substrates and having a pixel electrode in a pixel on one of the substrates, the pixel electrode comprising:
   a reflective electrode for reflecting light from outside; and
   a transmissive electrode for transmitting light from a back light source,
   wherein the reflective electrode and the transmissive electrode are laminated with no insulating layers interposed therebetween and the transmissive electrode has a concavity in a pixel and at least a portion of the concavity is covered with the reflective electrode.

2. A liquid crystal display device according to claim 1, wherein the reflective electrode is formed at a top layer.

3. A liquid crystal display device according to claim 2, wherein the reflective electrode is configured by forming a conductive material to cover the reflective electrode before pattern formation, and removing the conductive material after the pattern formation.

4. A liquid crystal display device according to claim 3, wherein material of the reflective electrode includes aluminum, and material of the conductive material includes one selected from a group of chromium, molybdenum, tantalum, and tungsten.

5. A liquid crystal display device provided with liquid crystal material sealed between substrates and having a pixel electrode in a pixel on one of the substrates, the pixel electrode comprising:
   a reflective electrode for reflecting light from outside; and
   a transmissive electrode for transmitting light from a back light source,
   wherein the reflective electrode and the transmissive electrode are laminated with no insulating layers interposed therebetween and a part of the transmissive electrode is removed at a connection between the transmissive electrode and a first metal thin film, and the part is covered with the reflective electrode, so that the reflective electrode is connected to the first metal thin film.

6. A liquid crystal display device provided with liquid crystal material sealed between substrates and having a pixel electrode in a pixel on one of the substrates, the pixel electrode comprising:
   a reflective electrode for reflecting light from outside: and
   a transmissive electrode for transmitting light from a back light source,
   wherein the reflective electrode and the transmissive electrode are laminated with no insulating layers interposed therebetween and a part of the transmissive electrode is removed at a connection between the transmissive electrode and a second metal thin film, and the part is covered with the reflective electrode, so that the reflective electrode is connected to the second metal thin film.

7. A liquid crystal display device according to claim 1, wherein a periphery of the transmissive electrode in a pixel is covered with the reflective electrode.

8. A liquid crystal display device according to claim 1, wherein the inner side portion of the concavity is covered with the reflective electrode.

9. A liquid crystal display device according to claim 8, wherein the overlap of the reflective electrode with the inner side portion is 2 µm to 6 µm.

10. A liquid crystal display device according to claim 1, wherein a semiconductor film in a thin film transistor (TET) section in the pixel extends to a lower part of a source line.

11. A manufacturing method of a liquid crystal display device provided with liquid crystal material sealed between substrates and having a pixel electrode in a pixel on one of the substrates, the pixel electrode having a reflective electrode for reflecting light from outside and a transmissive electrode for transmitting light from a back light source, the manufacturing method comprising:
- a step of forming the transmissive electrode having a concavity in a pixel; and
- a step of forming the reflective electrode which covers at least a portion of the concavity on the transmissive electrode, with no insulating layers interposed therebetween.

12. A manufacturing method of a liquid crystal display device according to claim 11, provided with liquid crystal material sealed between substrates and having a pixel electrode in a pixel on one of the substrates, the pixel electrode having a reflective electrode for reflecting light from outside and a transmissive electrode for transmitting light from a back light source, the manufacturing method comprising:
- a step of forming the transmissive electrode; and
- a step of forming the reflective electrode on the transmissive electrode, with no insulating layers interposed therebetween,
- wherein the step of forming the reflective electrode comprises:
  - a step of forming a conductive material to cover the reflective electrode before pattern formation; and
  - a step of removing the conductive material after the pattern formation.

13. A manufacturing method of the liquid crystal display device according to claim 12, wherein material of the reflective electrode includes aluminum, and material of the conductive material includes one selected from a group of chromium, molybdenum, tantalum, and tungsten.

14. A manufacturing method of the liquid crystal display device according to claim 11, further comprising:
- a step of forming and patterning a first metal thin film on an insulating substrate;
- a step of depositing a first insulation layer, a semiconductor active layer, an ohmic contact layer, and a second metal thin film;
- a step of forming a resist pattern by halftone exposure; and
- a step of patterning the semiconductor active layer, the ohmic contact layer, and the second metal thin film by etching.

15. A manufacturing method of the liquid crystal display device according to claim 14, further comprising after the step of patterning the semiconductor active layer, the ohmic contact layer, and the second metal thin film by etching:
- a step of forming a second insulation layer;
- a step of forming an uneven pattern by halftone exposure; and
- a step of patterning the first insulation layer and the second insulation layer by etching.

16. A manufacturing method of the liquid crystal display device according to claim 11, further comprising:
- a step of forming and patterning a first metal thin film on an insulating substrate;
- a step of depositing a first insulation layer, a semiconductor active layer, an ohmic contact layer, and a second metal thin film;
- a step of forming a resist pattern by halftone exposure;
- a step of forming a second insulation layer after the step of patterning the semiconductor active layer, the ohmic contact layer, and the second metal thin film by etching;
- a step of forming an uneven pattern by halftone exposure; and
- a step of patterning the first insulation layer and the second insulation layer by etching.

17. A manufacturing method of a liquid crystal display device provided with liquid crystal material sealed between substrates and having a pixel electrode in a pixel on one of the substrates, the pixel electrode having a reflective electrode for reflecting light from outside and a transmissive electrode for transmitting light from a back light source, the manufacturing method comprising:
- a step of forming the transmissive electrode; and
- a step of forming the reflective electrode on the transmissive electrode, with no insulating layers interposed therebetween,
- wherein the step of forming the transmissive electrode comprises:
  - a step of forming amorphous indium tin oxide;
  - a step of patterning the amorphous indium tin oxide; and
  - a step of crystallizing the amorphous indium tin oxide.

18. A manufacturing method of a liquid crystal display device according to claim 17, wherein, in the step of crystallizing the amorphous ITO, the amorphous indium tin oxide is heated to 200° C. or above for crystallization.

* * * * *